US008146017B2

(12) United States Patent
Malek et al.

(10) Patent No.: US 8,146,017 B2
(45) Date of Patent: Mar. 27, 2012

(54) DECLARATIVE DATA BINDING AND DATA TYPE PROPAGATION IN A REMOTE WORKFLOW SCHEDULE AUTHORING SYSTEM

(75) Inventors: Alexander Malek, Seattle, WA (US); Phillip David Allen, Redmond, WA (US); Stuart B. Kolodner, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 633 days.

(21) Appl. No.: 11/606,431

(22) Filed: Nov. 30, 2006

(65) Prior Publication Data

US 2008/0114810 A1      May 15, 2008

Related U.S. Application Data

(63) Continuation of application No. 11/598,573, filed on Nov. 13, 2006, now Pat. No. 8,010,850.

(51) Int. Cl.
G06F 3/00 (2006.01)
(52) U.S. Cl. ......... 715/835; 715/965; 715/967; 707/602
(58) Field of Classification Search .................. 715/835, 715/965, 967; 707/102, 602
See application file for complete search history.

(56) References Cited

U.S. PATENT DOCUMENTS

| | | | |
|---|---|---|---|
| 6,073,242 A | 6/2000 | Hardy et al. | |
| 6,424,948 B1* | 7/2002 | Dong et al. | 705/9 |
| 6,518,989 B1* | 2/2003 | Ishikawa | 715/848 |
| 6,725,445 B1 | 4/2004 | Leymann et al. | |
| 6,854,016 B1 | 2/2005 | Kraenzel et al. | |
| 6,968,343 B2 | 11/2005 | Charisius et al. | |
| 7,069,536 B2 | 6/2006 | Yaung | |
| 7,100,147 B2 | 8/2006 | Miller et al. | |
| 7,221,377 B1* | 5/2007 | Okita et al. | 345/629 |
| 7,242,991 B2* | 7/2007 | Budinger et al. | 700/95 |
| 7,428,535 B1* | 9/2008 | Peyton et al. | 707/5 |
| 2002/0091559 A1 | 7/2002 | Beniyama et al. | |
| 2003/0043979 A1 | 3/2003 | Smith | |
| 2004/0015369 A1 | 1/2004 | Kim et al. | |
| 2004/0025048 A1 | 2/2004 | Porcari et al. | |
| 2004/0098284 A1 | 5/2004 | Petito et al. | |
| 2005/0027544 A1 | 2/2005 | Newstead et al. | |
| 2005/0043982 A1* | 2/2005 | Nguyen | 705/8 |
| 2005/0120298 A1 | 6/2005 | Petrujkic | |
| 2006/0070025 A1 | 3/2006 | Mauceri et al. | |

OTHER PUBLICATIONS

Ferguson, et al."WebSphere as an e-business server", Retrieved at<<http://www.research.ibm.com/journal/sj/401/ferguson.pdf>>, IBM Systems Journals vol. 40, No. 1, 2001, pp. 25-45.
Bolcer, et al."Advanced Workflow Management Technologies", Retrieved at<<http://www.ics.uci.edu/~taylor/documents/1998-AdvancedWorkflow.pdf>>, Mar. 3, 1999, pp. 60.

(Continued)

*Primary Examiner* — Michael Roswell
(74) *Attorney, Agent, or Firm* — Hope Baldauff Hartman, LLC

(57) ABSTRACT

Methods, systems, apparatus, and computer-readable media are provided herein for declarative data binding and data type propagation in a remote workflow schedule authoring system. According to one method, a user interface is provided for binding a parameter in a workflow action rule to a data value provided by a data source. The user interface may include a control for specifying a data source and a data field to which the parameter should be bound. The parameter is bound to the data source and data field selected using the user interface. If the data type of the selected data source is identical to the data type of the parameter, an internal lookup may be performed to retrieve the data value. Otherwise, the data type of the parameter may be propagated to the data source during lookup of the data value.

13 Claims, 9 Drawing Sheets

OTHER PUBLICATIONS

Bolcer Gregory Alan, "Flexible and Customizable Workflow Execution on the WWW", Retrieved at<<http://ftp.ics.uci.edu/pub/process/docs/EndDissertation.pdf>>, 1998, pp. 254.

U.S. Official Action dated Nov. 25, 2009 in U.S. Appl. No. 11/598,573.

Malek, et al., Official Action dated Jun. 10, 2009 in U.S. Appl. No. 11/598,573.

U.S. Official Action dated Jun. 10, 2009 in U.S. Appl. No. 11/598,573.

U.S. Official Action dated May 26, 2010 in U.S. Appl. No. 11/598,573.

* cited by examiner

DECLARATIVE DATA BINDING AND DATA TYPE PROPAGATION IN A REMOTE WORKFLOW SCHEDULE AUTHORING SYSTEM

CROSS-REFERENCE TO RELATED APPLICATIONS

This application is a continuation of U.S. patent application Ser. No. 11/598,573 filed on Nov. 13, 2006, and entitled "Remote Workflow Schedule Authoring".

BACKGROUND

A workflow defines a series of tasks within an organization to produce a final outcome. Workflows allow for business process formalization and management. A collaborative workgroup computing application allows different workflows to be defined for different types of jobs. For example, in a publishing setting, a document may be automatically routed from writer to editor to proofreader to production. At each stage in the workflow, one individual or group is responsible for a specific task. Once the task is complete, the workflow application ensures that the individuals responsible for the next task are notified and receive the data needed to execute the next stage of the process.

A workflow schedule authoring tool enables a user to author a workflow by arranging building blocks in a particular order. Building blocks may correspond to events, conditions, or actions. Each building block is associated with source code that defines an action to be taken when the building block is executed. The order of the building blocks determines the workflow schedule process that will be performed when the workflow schedule is executed by a workflow execution engine on a server computer. Some building blocks may be predefined for commonly used actions. Other building blocks may be customized to execute a specific function or to provide a solution to a unique problem. The building blocks simplify workflow schedule authoring because the user does not need to write any code.

Previous workflow schedule authoring tools require all of the building blocks utilized in a workflow schedule to be stored on both the server and the remote computer that is utilized to author the workflow. This requirement, however, may be a barrier to deploying new building blocks on the server computer. Additionally, in remote workflow authoring systems where multiple users are permitted to concurrently edit the same workflow, conflicts can arise as a result of different versions of the same workflow being stored on the server computer. Moreover, in such systems no safeguards are provided for ensuring that the workflow engine cannot execute unauthorized building blocks.

It is with respect to these considerations and others that the disclosure made herein is provided.

SUMMARY

Methods and computer-readable media are provided herein for remotely authoring a workflow schedule. Through the embodiments presented herein, the building blocks utilized in creating a workflow schedule do not need to be stored at the remote computer that is utilized to author the workflow. Safeguards are also provided at various stages in the authoring process to ensure that each building block has been authorized for use and execution by a workflow schedule, and to eliminate conflicts between different versions of workflow schedules.

According to one aspect presented herein, a method is provided for remotely authoring a workflow schedule. According to one method, a workflow schedule authoring tool (referred to herein as the "authoring tool") is provided that includes a user interface and associated functionality for creating workflow schedules by arranging building blocks, called workflow actions, in a particular order. Workflow actions may correspond to events, conditions, or actions. The authoring tool is executed at a client computer and workflow schedules created at the client computer are transmitted to a server computer for execution.

According to one aspect, the authoring tool is operative to receive a list of available workflow actions from the server computer. In response to receiving the list, the authoring tool then determines whether the workflow actions are present on the client computer. If the workflow actions are not present on the client computer, the authoring tool transmits a request to the server computer for data from which workflow action proxies for the missing workflow actions may be created. A workflow action proxy is an object that includes the properties of the associated workflow action but does not include an implementation for its methods. As described in detail herein, the workflow action proxies are utilized at the client computer during authoring to simulate the interfaces and properties of the corresponding workflow action. At execution time, however, the server computer utilizes the actual workflow actions to perform the associated workflow processing. In this manner, workflow schedules can be remotely authored without transferring all of the required executable workflow actions from the server computer to the client computer. Only the data for constructing the workflow action proxies is transferred.

In response to receiving the request for data from which workflow action proxies may be created, the server computer determines whether the identified workflow actions are authorized for use in a workflow schedule. This may be accomplished, for instance, by examining a safe workflow actions list that includes data identifying workflow actions as either being safe or unsafe for execution. If the identified workflow actions are safe for execution, the server computer returns the data for creating the workflow action proxies in response to the request. If the identified workflow actions are not safe for execution, however, the server computer will not return the data.

Using the data received from the server computer, the authoring tool constructs the workflow action proxies. The proxies may then be utilized during the workflow schedule authoring process in place of the actual workflow actions. Workflow actions stored at the client computer may also be utilized during creation of the workflow schedule. Once the workflow schedule has been completed, the client computer transmits the workflow schedule to the server computer for storage. The authoring tool may also transmit a request to the server computer to verify the contents of the workflow schedule.

In response to receiving a request to verify the workflow schedule, the server computer performs processing operations to verify the contents of the workflow schedule. In particular, in one implementation the server computer identifies the workflow actions identified in the workflow schedule. The server computer then determines whether the workflow actions in the workflow schedule are authorized for use in a workflow schedule. As described above, the server computer may examine a safe workflow actions list to make this determination. If the workflow actions in the workflow schedule are authorized for use, the server computer returns a success indication to the client computer in response to the request. If the workflow actions in the workflow schedule are not authorized for use, however, the server computer will return a failure response to the client computer.

Once the workflow schedule has been verified, the workflow schedule may be instantiated and executed. This may occur, for instance, in response to the occurrence of an event or in response to a manual request to execute the workflow schedule. Prior to executing the workflow schedule, however, the server computer again determines whether the workflow actions in the workflow schedule to be executed are authorized for use. If the workflow actions in the workflow schedule to be executed are authorized for use, the workflow schedule is instantiated. If the workflow actions in the workflow schedule to be executed are not authorized for use, the server computer will not instantiate the unsafe workflow actions.

According to other aspects provided herein, the server computer stores workflow schedules in a versioned document library. Through facilities provided by the document library, each version of a workflow schedule is assigned a version number. Newly created instances of workflow schedules utilize the most recent version of the workflow schedule. Previously instantiated instances, however, continue to utilize the version of the workflow schedule that was utilized when the workflow schedule was first instantiated. In this manner, each instance of a workflow schedule utilizes the same version of the workflow schedule during its entire lifespan, thereby eliminating conflicts between different versions of workflow schedules.

According to other aspects, the authoring tool includes a user interface for declaratively binding parameters in a workflow action rule to data values. In particular, a user interface is provided by the authoring tool through which a user can specify a data source and a data field within the data source to which the parameter should be bound. The user interface may include user interface controls displaying the available data sources and data fields. The controls may be filtered to display only data sources and data fields having data types compatible with the data type of the parameter.

Using the user interface, a user can declaratively bind parameters in a workflow action rule to a data source. According to aspects, the data type of the parameter may be propagated to the data type of the data source, if necessary. In particular, if the data type of the selected data source is identical to the data type of the parameter, an internal lookup may be performed to retrieve the data value. Otherwise, the data type of the parameter is propagated to the data source during lookup of the data value.

The above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
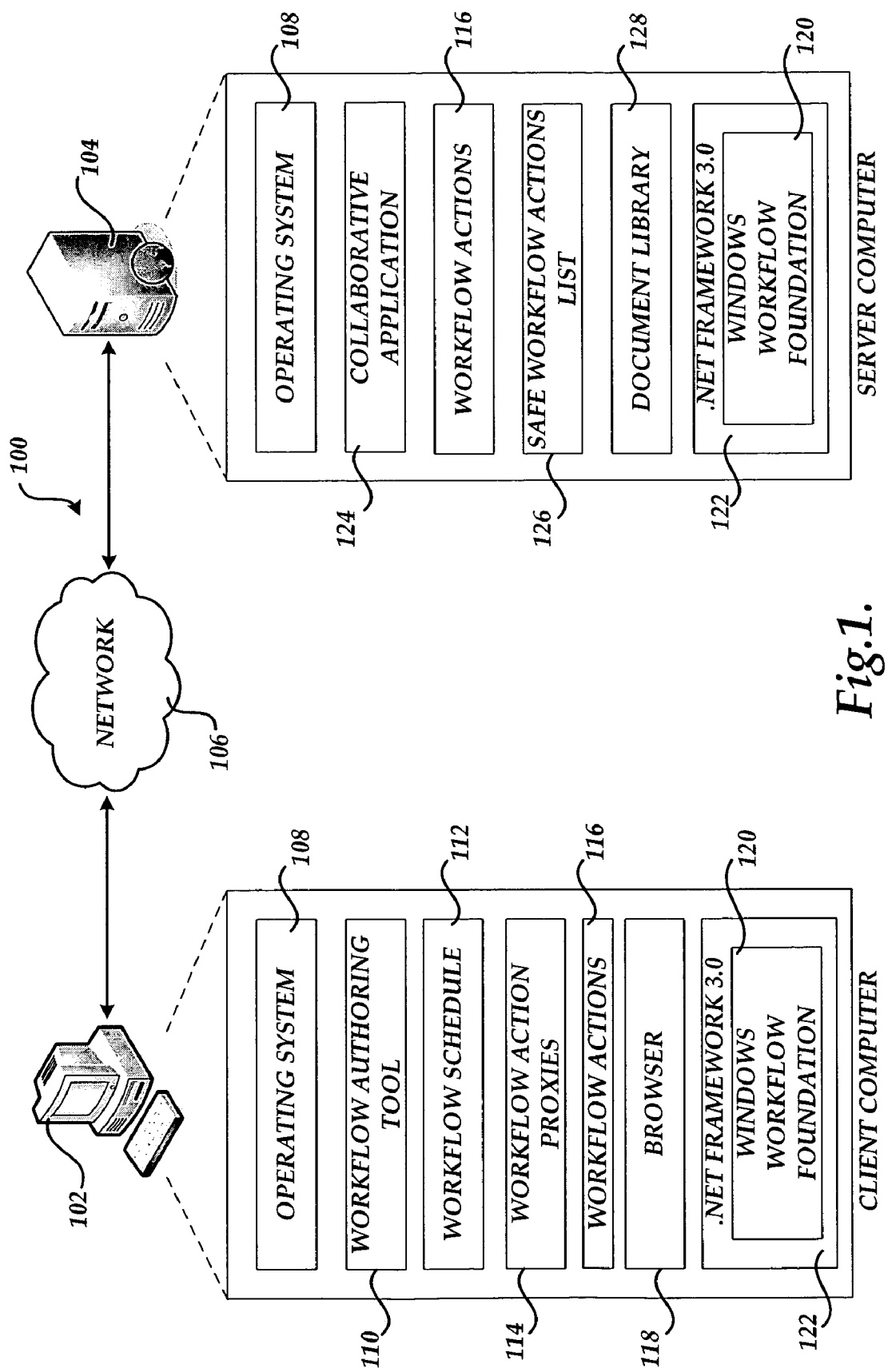
FIG. 1 is a network and software diagram showing an illustrative operating environment for the processes and computer systems described herein and several of the software components utilized by the computer systems described herein.

The following detailed description is directed to systems, methods, apparatus, and computer-readable media for remotely authoring a workflow schedule. As will be described in greater detail herein, a workflow schedule authoring tool is provided that can utilize workflow action proxies instead of the workflow actions themselves during authoring. This eliminates the need to transfer executable workflow actions from a server computer to the client computer executing the authoring tool. Moreover, functionality is described herein for performing authorization checks at the server computer during the authoring process to ensure that only authorized workflow actions are utilized and executed. The server computer is also operative to provide versioning functionality for the workflow schedules to thereby eliminate the possibility of conflicts occurring between different versions of a workflow schedule. Additional details regarding each of these subject areas will be provided below with respect to the FIGURES.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

The subject matter presented herein is also described as being practiced in a distributed computing environment where tasks are performed by remote processing devices that are linked through a communications network and wherein program modules may be located in both local and remote memory storage devices. It should be appreciated, however, that the implementations described herein may also be utilized in conjunction with stand-alone computer systems and other types of computing devices. It should also be appreciated that although reference is made herein to the Internet, the embodiments presented herein may be utilized with any type of local area network ("LAN") or wide area network ("WAN").

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for remote authoring of a workflow schedule will be described. In particular, FIG. 1 is a network diagram illustrating aspects of an illustrative operative environment for the subject matter described herein that includes a client computer 102, a network 106, and a server computer 104.

As shown in FIG. 1, the client computer 102 and the server computer 104 are communicatively coupled to one another through respective connections to the network 106. According to one implementation, the network 106 comprises the Internet. However, it should be appreciated that the network 106 may comprise a LAN, WAN, or other type of network suitable for connecting the client computer 102 and the server computer 104.

FIG. 1 also illustrates a number of software components utilized by the client computer 102 and the server computer 104. In particular, the client computer 102 includes an operating system 108 suitable for controlling the operation of a networked desktop or laptop computer. The server computer 104 includes an operating system 108 suitable for controlling the operation of a networked server computer. For instance, according to implementations, both the client computer 102 and server computer 104 may utilize the WINDOWS XP or WINDOWS VISTA operating systems from MICROSOFT CORPORATION of Redmond, Wash. Other operating systems, such as the LINUX operating system or the OSX operating system from APPLE COMPUTER, INC. may be utilized. It should be appreciated that although the embodiments presented herein are described in the context of a desktop or laptop client computer 102 and a remote server computer 104, many other types of computing devices and systems may be utilized to embody the various aspects presented herein.

According to one implementation, the client computer 102 also includes a Web browser program (referred to herein as a "browser") 118. The browser 118 is operative to request, receive, and display information pages, such as Web pages, from the server computer 104. In particular, the browser 118 is operative to establish a connection to a collaborative application 124 executing on the server computer 104. Through the connection, the browser 118 may request information pages provided by the collaborative application 124. The collaborative application 124 is a computer software program that enables multiple users to collaborate on documents, projects, tasks, and other matters.

The collaborative application 124 also supports workflow processes. In general, a workflow is an abstraction of how work flows through a business process. This abstract notion of workflow has been modeled in computer programs and computer software for supporting workflow through a business process has become known as "workflow." Hereinafter, the term workflow refers to such a software model (i.e., a software program that supports the modeling of how work flows through a business process). In one implementation, the collaborative application 124 is the MICROSOFT OFFICE SHAREPOINT SERVER 2007 from MICROSOFT CORPORATION of Redmond, Wash. It should be appreciated, however, that the implementations described herein may be utilized with any type of computer system that supports workflow processes.

In order to support the provision of workflow, in one implementation the server computer 104 includes the .NET FRAMEWORK 3.0 122 from MICROSOFT CORPORATION. The .NET FRAMEWORK 3.0 122 is a framework for building, deploying, and running Web services and other applications. The .NET FRAMEWORK 3.0 122 includes the WINDOWS WORKFLOW FOUNDATION ("WF") 120. The WF 120 is a programming model, engine, and tools for building and executing workflow enabled applications. The WF 120 allows a developer to more easily model and support business processes. Details regarding the .NET FRAMEWORK 3.0 122 and the WF 120 are publicly available from the MICROSOFT DEVELOPERS NETWORK ("MSDN") and from other sources.

The WF 120 includes a workflow engine for instantiating and executing instances of workflows created using authoring tools, such as the workflow authoring tool 110. The workflow engine runs a workflow by advancing the workflow through a workflow schedule 112. The workflow schedule 112 is a data structure containing data that identifies the workflow actions 116 that should be executed as a part of the workflow, workflow logic, and various metadata. As will be described in greater detail below, the workflow authoring tool 110 may be utilized to author the workflow schedule 112. The workflow schedule 112 may then be transmitted to the server computer 104 for execution as a part of the collaborative services provided by the collaboration application 124. Additional details regarding this process are provided below.

As shown in FIG. 1, the client computer 102 also includes the .NET FRAMEWORK 3.0 122 and WF 120 for use during the workflow authoring process described herein. It should be appreciated that although the implementations presented herein are described in the context of the .NET FRAMEWORK 3.0 122 and the WF 120, other similar programming frameworks and workflow modeling tools available from other manufacturers may be utilized on the client computer 102 and server computer 104 to implement the embodiments presented herein. Additional details regarding the provision of and use of workflow in a collaborative application can be found in U.S. patent application Ser. No. 11/117,808, filed on Apr. 29, 2005 and entitled "Workflow Hosting Computing System Using a Collaborative Application," U.S. patent application Ser. No. 11/212,207, filed on Aug. 25, 2005 and entitled "Workflow Tasks in a Collaboration Application," and U.S. patent application Ser. No. 11/087,123, filed on Mar. 22, 2005 and entitled "Workflow Association in a Collaborative Application," each of which is assigned to the assignee of the instant application and expressly incorporated herein by reference in its entirety.

As discussed briefly above, the client computer 102 is operative to execute a workflow authoring tool 110. The authoring tool 110 is an application program that provides facilities for visually creating workflows that can be executed by the collaborative application 124. In particular, through the facilities provided by the authoring tool 110, a user can graphically create a workflow schedule 112. Additional details regarding the operation of the workflow authoring tool 110 can be found in U.S. patent application Ser. No. 10/955,659, filed on Sep. 30, 2004 and entitled "Workflow Schedule Authoring Tool," which is assigned to the assignee of the instant application and expressly incorporated herein by reference in its entirety.

The workflow schedule 112 references various workflow actions 116 that are the building blocks that perform the actual processing for the various steps of the workflow. The workflow actions 116 are executable components that may correspond to events, conditions, or actions within a workflow process. As shown in FIG. 1, the workflow actions 116 are stored on the server computer 104 for use when the workflow schedule 112 is executed. Some of the workflow actions 116 may also be stored on the client computer 102 for use during the authoring of a workflow schedule 112.

In certain scenarios, it is impracticable or undesirable for all of the workflow actions 116 available at the server computer 104 to be stored on the client computer 102. For instance, new workflow actions 116 may be added to the server computer 104 after deployment. In many cases it is impracticable or undesirable to transmit these workflow actions 116 to the client computer 102. In previous workflow authoring systems, this would result in the client computer 102 being unable to use any workflow actions 116 that were not stored directly thereon. In order to address this problem, the authoring tool 110 is operative to determine which workflow actions 116 are not stored thereon and to request data from which workflow action proxies 114 may be constructed for the missing workflow actions 116.

The workflow action proxies 114 are software objects that include the properties of the associated workflow action 116 but that do not include an implementation for its methods. The workflow action proxies 114 are utilized at the client computer 102 during authoring to simulate the interfaces and properties of the corresponding workflow action 116. At execution time, however, the server computer 104 utilizes the actual workflow actions 116 to perform the associated workflow processing. In this manner, workflow schedules 112 can be remotely authored without transferring all of the required executable workflow actions 116 from the server computer 104 to the client computer 102. Only the metadata needed by the client computer 102 to construct the workflow action proxies 114 is transferred.

Using the metadata received from the server computer 104, the authoring tool 110 constructs the workflow action proxies 114. The proxies 114 may then be utilized during the workflow schedule authoring process in place of the actual workflow actions 116. Any workflow actions 116 that are stored at the client computer 102 may also be utilized during creation of the workflow schedule 112. Once the workflow schedule 112 has been completed, the client computer 102 transmits the workflow schedule 112 to the server computer 104 for storage.

In one implementation, the server computer 104 stores workflow schedules 112 in a versioned document library 128 provided by the collaborative application 124. Through the use of versioning facilities provided by the document library 128, each version of a workflow schedule 112 is assigned a version number. Newly created instances of workflow schedules 112 utilize the most recent version of the workflow schedule 112. Previously instantiated instances, however, continue to utilize the version of the workflow schedule 112 that was utilized when the workflow schedule 112 was first instantiated. In this manner, each instance of a workflow schedule 112 utilizes the same version of the workflow schedule 112 during its entire lifespan. Additional details regarding this process will be provided below with reference to FIG. 3.

Once the workflow schedule 112 has been stored in the document library 128, the workflow schedule 112 may be instantiated and executed. This may occur, for instance, in response to the occurrence of an event or in response to a manual request to execute the workflow schedule 112. When the workflow schedule 112 is instantiated, the workflow actions 116 are utilized to perform the actual processing for the workflow. If a workflow action proxy 114 was utilized during authoring, the corresponding workflow action 116 is utilized at run time to perform the workflow processing.

As will be described in greater detail below, according to implementations, the server computer 104 is operative to verify that each of the workflow actions 116 referenced by a workflow schedule 112 have been authorized for execution. This may occur, for instance, at the time the authoring client 110 requests data for creating the workflow action proxies 114, at the time a workflow schedule 112 is verified by the server computer 104, and at run time. Additional details regarding these security mechanisms will be provided below with reference to FIGS. 2A-2C.

Figure 2A:
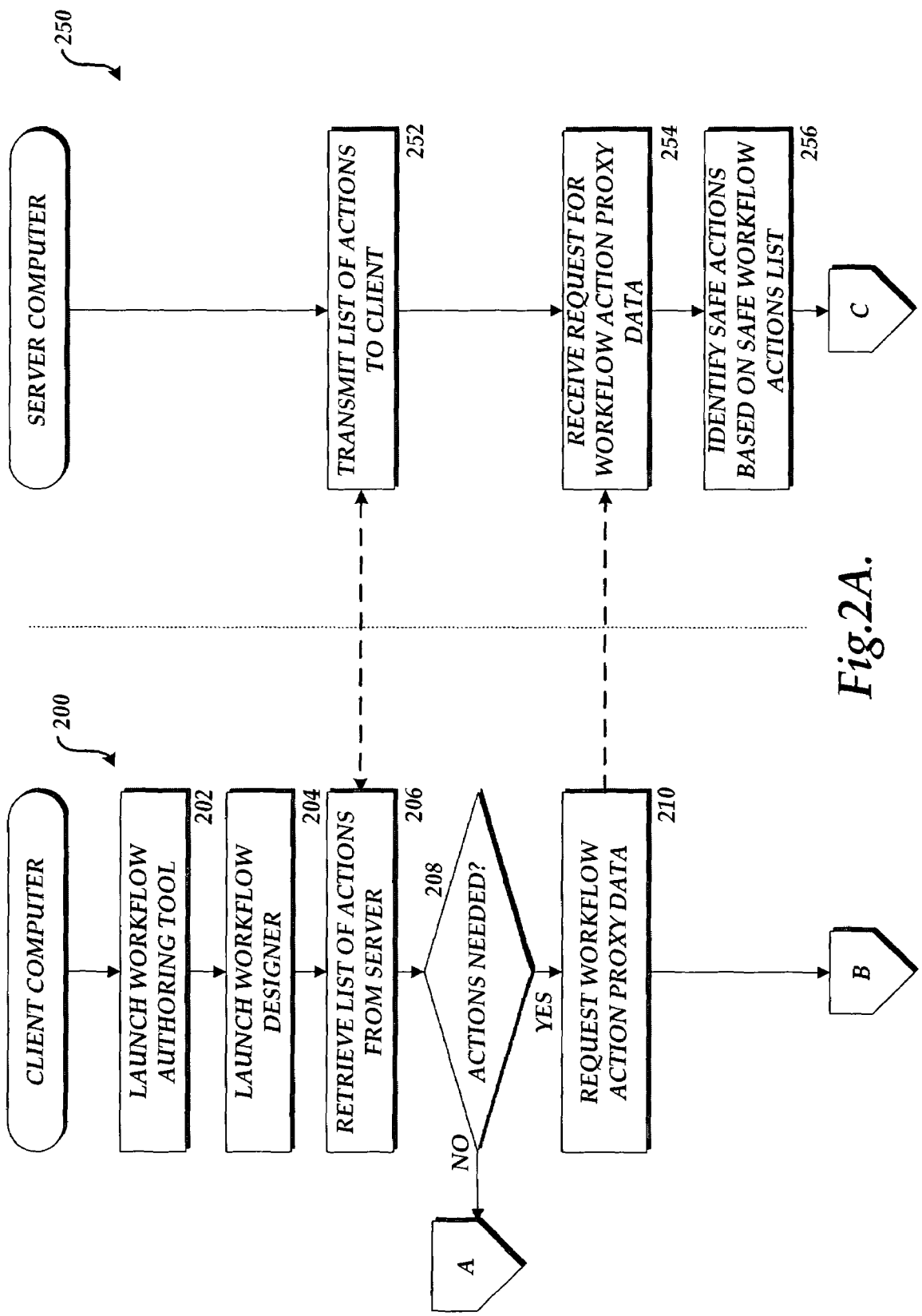
FIGS. 2A-2C and 3 are flow diagrams illustrating various processes provided herein for remotely authoring a workflow schedule.
Figure 2B:
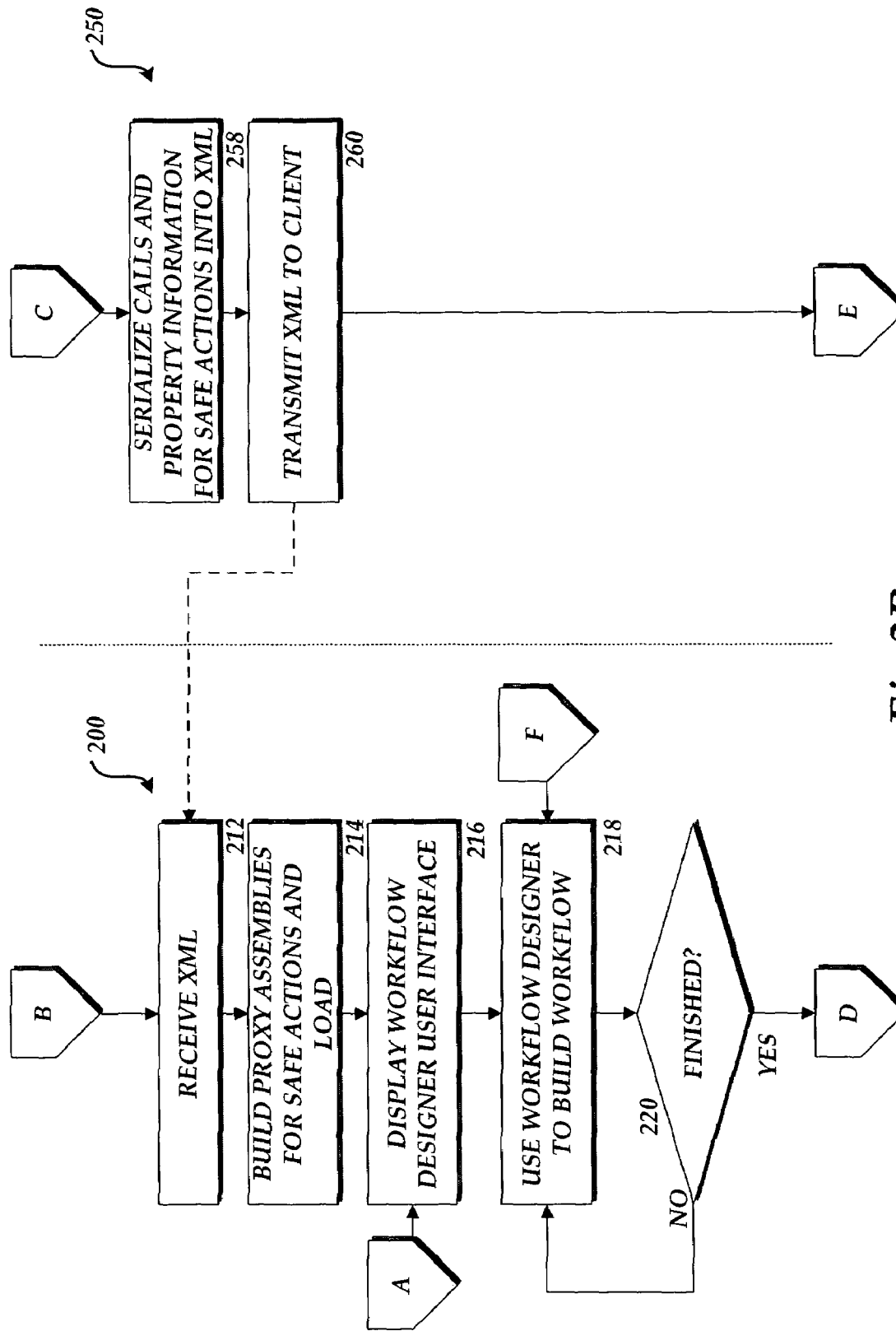
Figure 2C:
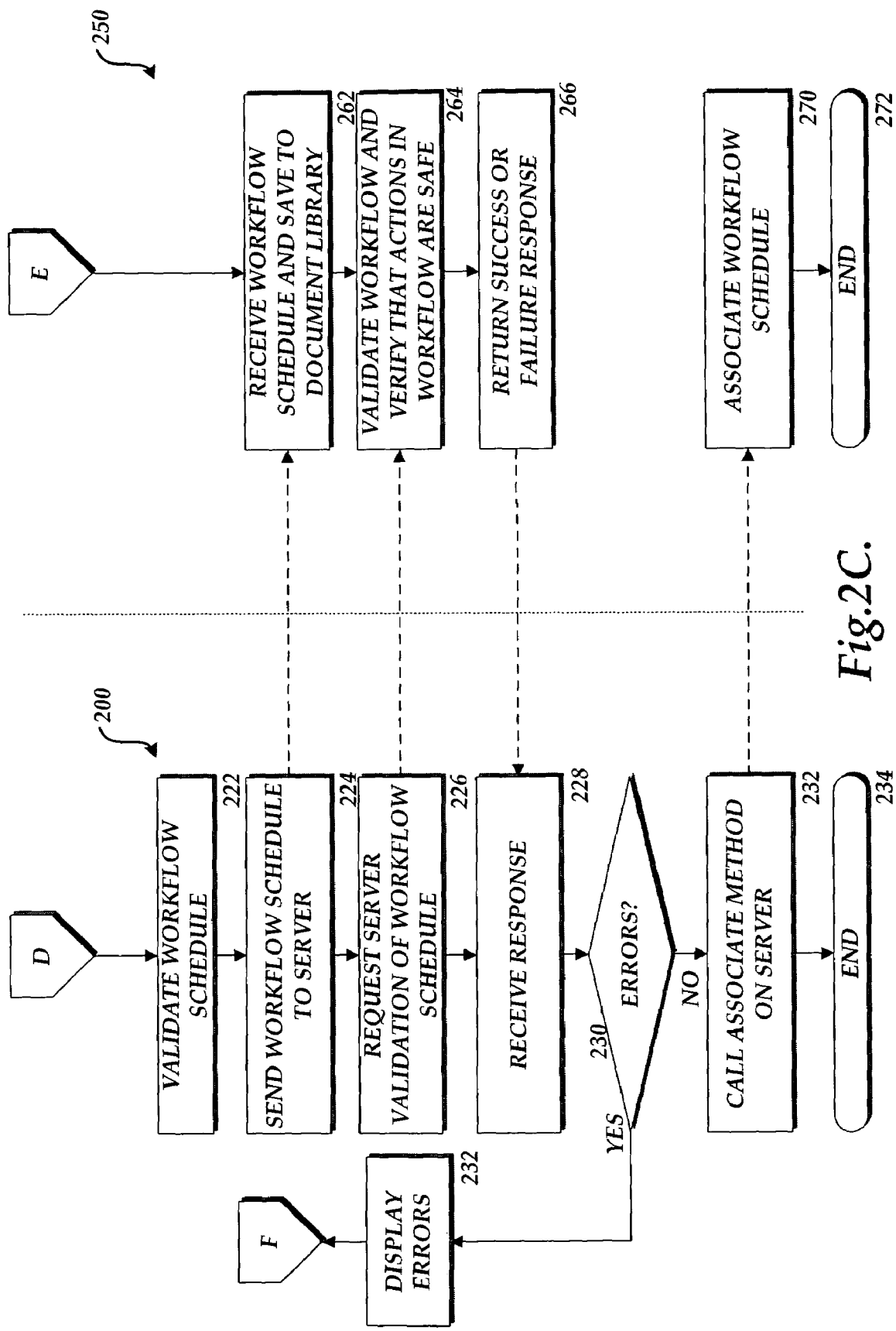

Referring now to FIGS. 2A-2C, additional details will be provided regarding the embodiments presented herein for remotely authoring a workflow schedule 112. In particular, FIGS. 2A-2C are flow diagrams illustrating the operation of the client computer 102 and the server computer 104 according to one implementation. The routine 200 illustrates processing operations performed by the client computer 102 while the routine 250 illustrates processing operations performed by the server computer 104. The routines 200 and 250 will be described in conjunction with one another.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance requirements of the computing system. Accordingly, the logical operations described herein are referred to variously as operations, structural devices, acts, or modules. These operations, structural devices, acts and modules may be implemented in software, in firmware, in special purpose digital logic, and any combination.

The routine 200 begins at operation 202, where the workflow authoring tool 110 is launched on the client computer 102. Once the workflow authoring tool 110 has been launched, the routine 200 continues to operation 204, where the workflow designer portion of the workflow authoring tool 110 is launched. The workflow designer is a portion of the workflow authoring tool 202 that provides functionality for visually defining a business workflow without programming. Several aspects of a user interface provided by the workflow designer are described below with reference to FIGS. 4A-4B and 5.

From operation 204, the routine 200 continues to operation 206, where the workflow authoring tool 110 retrieves a list of available workflow actions 116 from the server computer 104. The server computer 104 transmits the list of available workflow actions 116 to the client computer at operation 252 of the routine 250. In response to receiving the list of available workflow actions 116, the authoring tool 110 compares the actions identified in the received list to the workflow actions 116 already stored at the client computer 102. In this manner, the authoring tool 110 can determine the assemblies already present and loaded on the client computer 102 and the workflow actions 116 that are available from the server computer 104 that are not present on the client computer 102.

At operation 208, the workflow authoring tool 110 determines whether any workflow actions 116 are needed from the server computer 104. If no workflow actions 116 are needed, the routine 200 branches from operation 208 to operation 216, described below. If workflow actions 116 are needed, the routine 200 continues from operation 208 to operation to 210. At operation to 210, the workflow authoring tool 110 transmits a request for the data necessary to build the workflow action proxies 114 to the server computer 104. As discussed briefly above, rather than downloading all of the needed workflow actions 116, the workflow authoring tool 110 builds proxies 114 for each of the needed workflow actions 116.

The workflow action proxies 114 are objects that model a corresponding workflow action 116. The proxies 114 include the properties of the corresponding workflow action 116 and the appropriate interfaces. However, the workflow action proxies 114 do not provide any implementation for the methods contained in the corresponding workflow action 116. In this manner, the workflow action proxies 114 appear to the authoring tool 110 to be valid workflow actions 116 that can be utilized in a workflow schedule 112. The workflow action proxies 114 can therefore be utilized when creating a workflow schedule 112. As will be described in greater detail below, the actual workflow actions 116 are utilized by the server computer 104 when the workflow schedule 112 is instantiated.

The server computer 104 receives the request for the workflow action proxy data at the operation 254 of the routine 250. In response thereto, the routine 250 continues to operation 256 where the server computer 104 identifies the actions that are authorized for use in a workflow schedule 112. This may be accomplished, for instance, by examining the contents of the safe workflow actions list 126. The safe workflow actions list 126 comprises a list of all of the workflow actions 116 that are authorized for use in a workflow schedule 112. A workflow action 116 that is identified in the safe workflow actions list 126 as being authorized for use in a workflow schedule 112 is referred to herein as being "safe" for use. Once the server computer 104 has identified the safe workflow actions 116, the server computer 104 then determines whether each of the workflow actions 116 for which proxy data has been requested are safe. The server computer 104 will not return proxy data for any workflow action 116 that is not safe.

From operation 256, the routine 250 continues to operation 258 where the server computer 104 serializes the properties, methods, and other information necessary to generate the workflow action proxies 114 for each of the safe workflow actions 116 into an extensible markup language ("XML") document. The routine 250 then continues to operation 260 where the XML document is transmitted to the workflow authoring tool 110.

At operation 212 of the routine 200, the authoring tool 110 receives the XML document containing the metadata necessary to build the workflow action proxies 114 for each of the needed workflow actions 116. Once the XML document has been received, the routine 200 continues to operation 214, where the authoring tool 110 builds the workflow action proxies 114 for each of the needed workflow actions 116. Once the proxies 114 have been created, the authoring tool 110 loads the proxies 114 into memory for use.

From operation 216, the routine 200 continues to operation to 218, where the workflow designer may be utilized by a user to create the workflow schedule 112. As described above, the workflow designer provides a user interface through which workflow actions 116 can be visually arranged to create the workflow schedule 112. During this process, the workflow action proxies 114 are used in place of the workflow actions 116 to which they correspond.

When the user has finished building the workflow schedule 112 using the workflow designer, the routine 200 continues from operation 220 to operation 222. At operation 222, the authoring tool 110 validates the workflow schedule 112. The routine 200 then continues to operation 224 where the authoring tool 110 transmits the workflow schedule 112 to the server computer 104. The server computer 104 receives the workflow schedule 112 at operation 262 of the routine 250 and saves the workflow schedule 112 to the document library 128. As will be discussed in greater detail below, in one implementation, the document library 128 comprises a versioned document storage library provided by the collaborative application 124. When a workflow schedule 112 is stored in the document library 128, it is assigned a version number. The version number of each workflow schedule 112 is utilized to ensure that an instance of a particular version of a workflow schedule 112 is executed until it completes. This ensures that newer versions of a workflow schedule 112 will not conflict with the execution of a previous version of the same workflow schedule 112. Additional details regarding this process will be described below with reference to FIG. 3.

From operation 224, the routine 200 continues to operation 226 where the authoring tool 110 transmits a request to the server computer 104 to validate the workflow schedule 112. The server computer 104 may expose a remote application programming interface ("API") for this purpose. In response to receiving the validation request, the server computer 104 validates the workflow schedule 112 and verifies that all of the workflow actions 116 identified in the workflow schedule 112 are safe. The routine 250 then continues to operation 266 where the server computer returns a success message to the authoring tool 110 if the workflow schedule 112 is valid. If the workflow schedule 112 is not valid, the server computer 104 returns a failure response to the authoring tool 110.

At operation 228 of the routine 200, the authoring tool 110 receives the response to the validation request from the server computer 104. At operation 230, the authoring tool 110 determines if the response indicated that the workflow schedule 112 included errors. If the workflow schedule 112 has errors, the routine 200 branches from operation 230 to operation 232, where the errors are displayed. The routine 200 then continues from operation 232 to operation 218. At operation 218, described above, the workflow designer may be utilized to correct any errors in the workflow schedule 112.

If the response from the server computer 104 indicates that the workflow schedule 112 is valid, the routine 200 continues from operation 230 to operation 232. At operation 232, the authoring tool 110 calls a remote API on the server computer 104 for associating the workflow schedule 112 with a list on the server computer 104. In the context of the collaborative application 124, workflow schedules 112 are executed against items and documents identified within various lists. Multiple workflow schedules 112 may be executed against a given document or item in a list. By associating the workflow schedule 112 with a list, an indication is being provided regarding the types of documents or items with which the workflow schedule 112 should be utilized. The server computer 104 performs the association request at operation 270. Once the association request has been completed, the routines 200 and 250 continue to operations 234 and 272, respectively, where they end.

Figure 3:
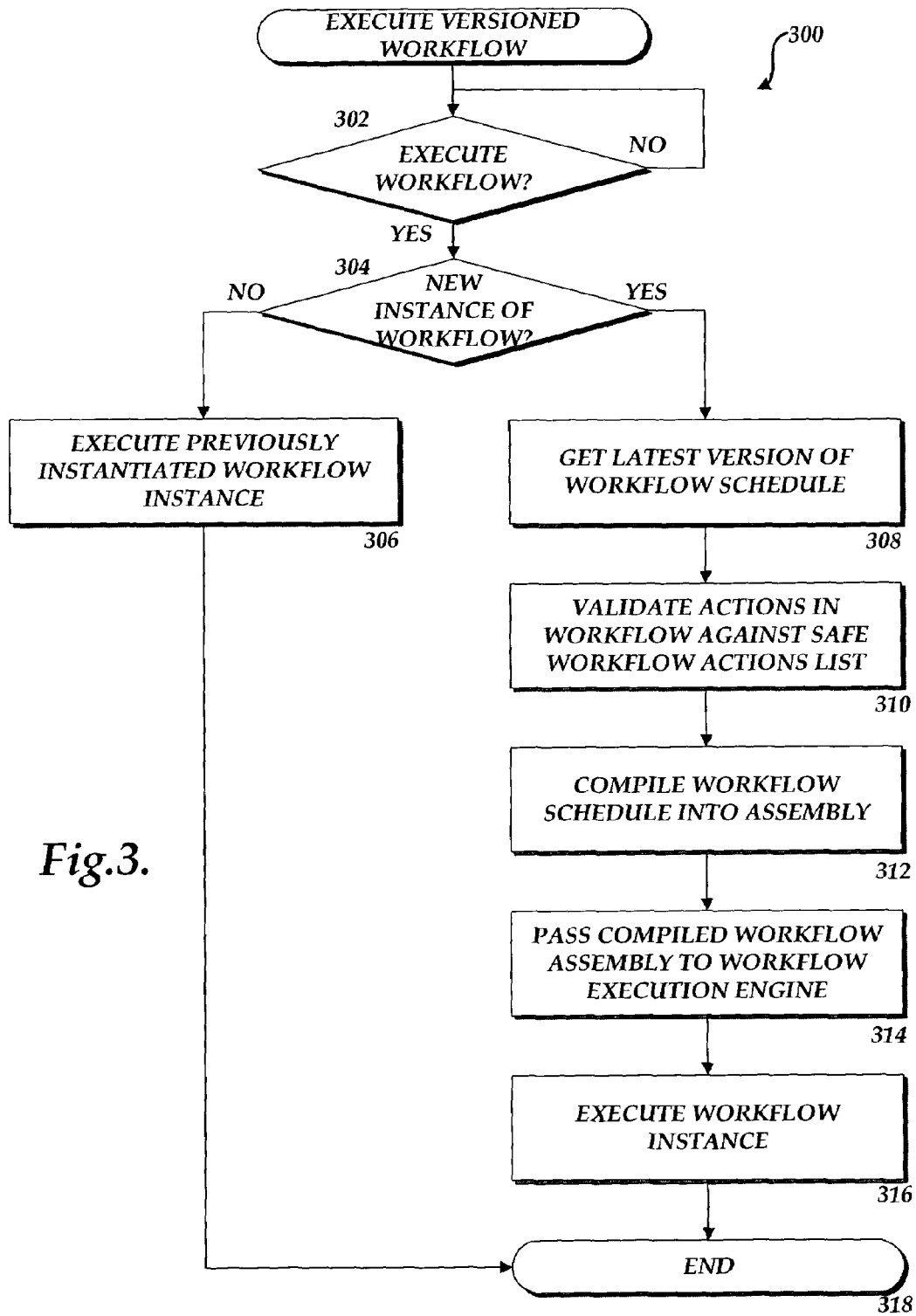

Referring now to FIG. 3, an illustrative routine 300 will be described illustrating aspects provided herein for executing workflow schedules 112 with reference to the version numbers assigned to the schedules when they are stored in the document library 128. In particular, the routine 300 begins at operation 302, where a decision is made as to whether a workflow schedule 112 should be executed. As described above, a workflow may be executed in response to an item in a list changing, an item being added to a list, or in response to a manual request. Additionally, instantiated workflows may be paused during execution. The occurrence of events or other conditions identified in the workflow may cause the previously instantiated workflow to continue execution. Accordingly, the determination made at operation 302 is whether to execute a new instance of a workflow schedule 112 or to continue the execution of a previously instantiated version of a workflow schedule 112. If a workflow schedule 112 is to be executed, the routine 300 continues from operation 302 to operation 304.

At operation 304, a determination is made as to whether the workflow schedule 112 to be executed is a new instance of the workflow or a previously instantiated instance of the workflow. If the workflow schedule 112 to be executed is a new instance of the workflow, the routine 300 branches from operation 304 to operation 308. At operation 308, the latest version of the workflow schedule 112 to be executed is retrieved from the document library 128. The routine 300 then continues to operation 310 where the workflow actions 116 in the workflow schedule 112 to be executed are again validated against the safe workflow actions list 126. If the workflow schedule 112 contains any workflow actions 116 not identified in the safe workflow actions list 126, the unsafe actions 116 will not be executed.

Once the workflow schedule 112 has been validated, the routine 300 continues from operation 310 to operation 312. At operation 312, the workflow schedule 112 is compiled into an executable assembly. The routine 300 then continues to operation 314, where the compiled workflow assembly is passed to the workflow execution engine in the WF 120 for execution. At operation 316, the instance of the workflow schedule 112 is executed. From operation 316, the routine 300 continues to operation 318, where it ends.

If, at operation 304, the server computer 104 determines that the workflow to be executed is a previously instantiated workflow, the routine 300 branches from operation 304 to operation 306. At operation 306, the previously instantiated version of the workflow is executed using the version of the workflow schedule 112 stored in the document library 128. By executing previously instantiated workflows using their originally assigned version number, each instance of a workflow continues executing using the appropriate version of the workflow schedule 112 until the instance has completed its execution. In this manner, the workflow schedule 112 can be edited and modified while instances of the workflow schedule 112 are executing without causing a conflict. From operation 306, the routine 300 continues to operation 318, where it ends.

Figure 4A:
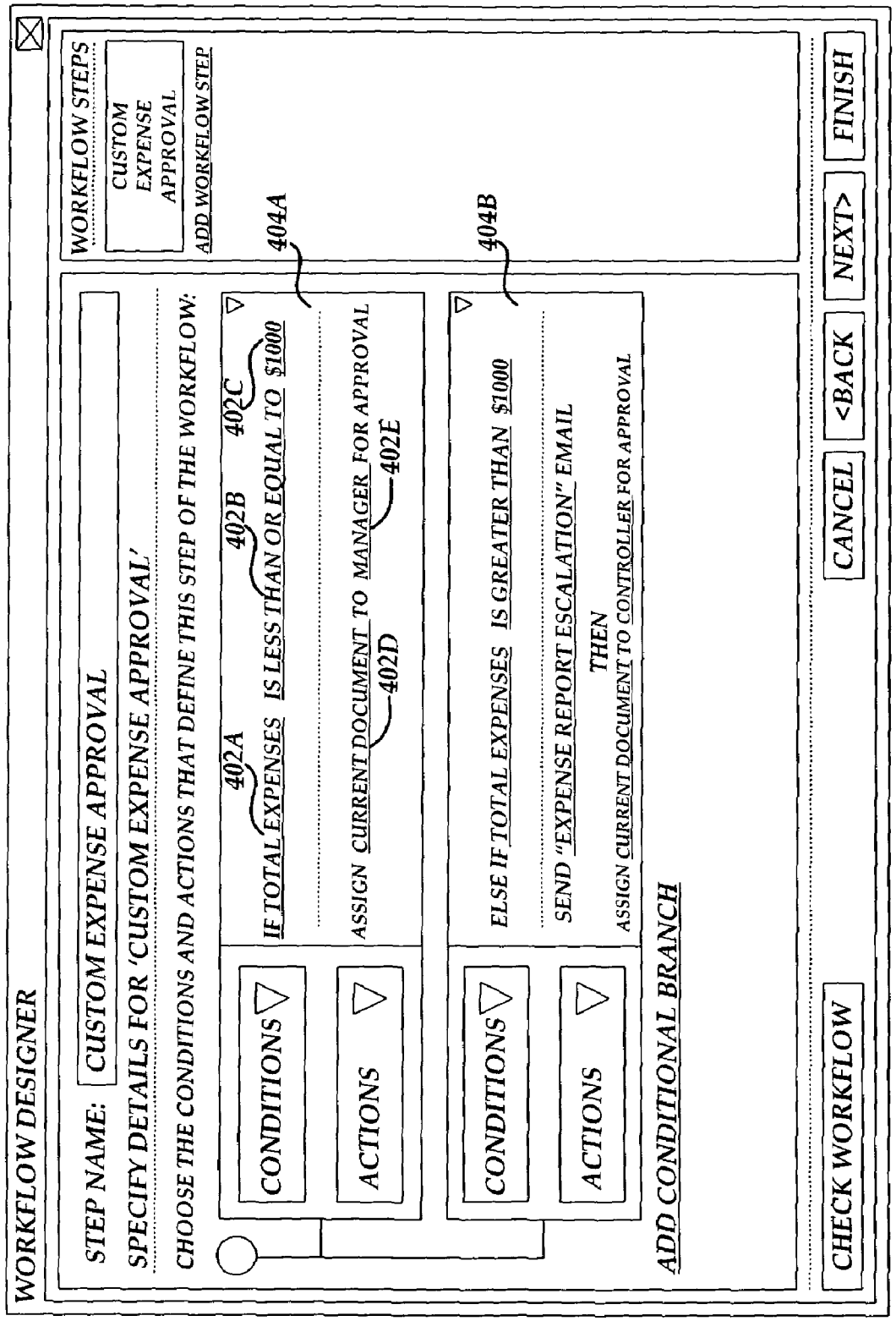
FIGS. 4A and 4B are user interface diagrams showing illustrative user interfaces provided herein for declarative data binding in a system for remotely authoring a workflow schedule.
Figure 4B:
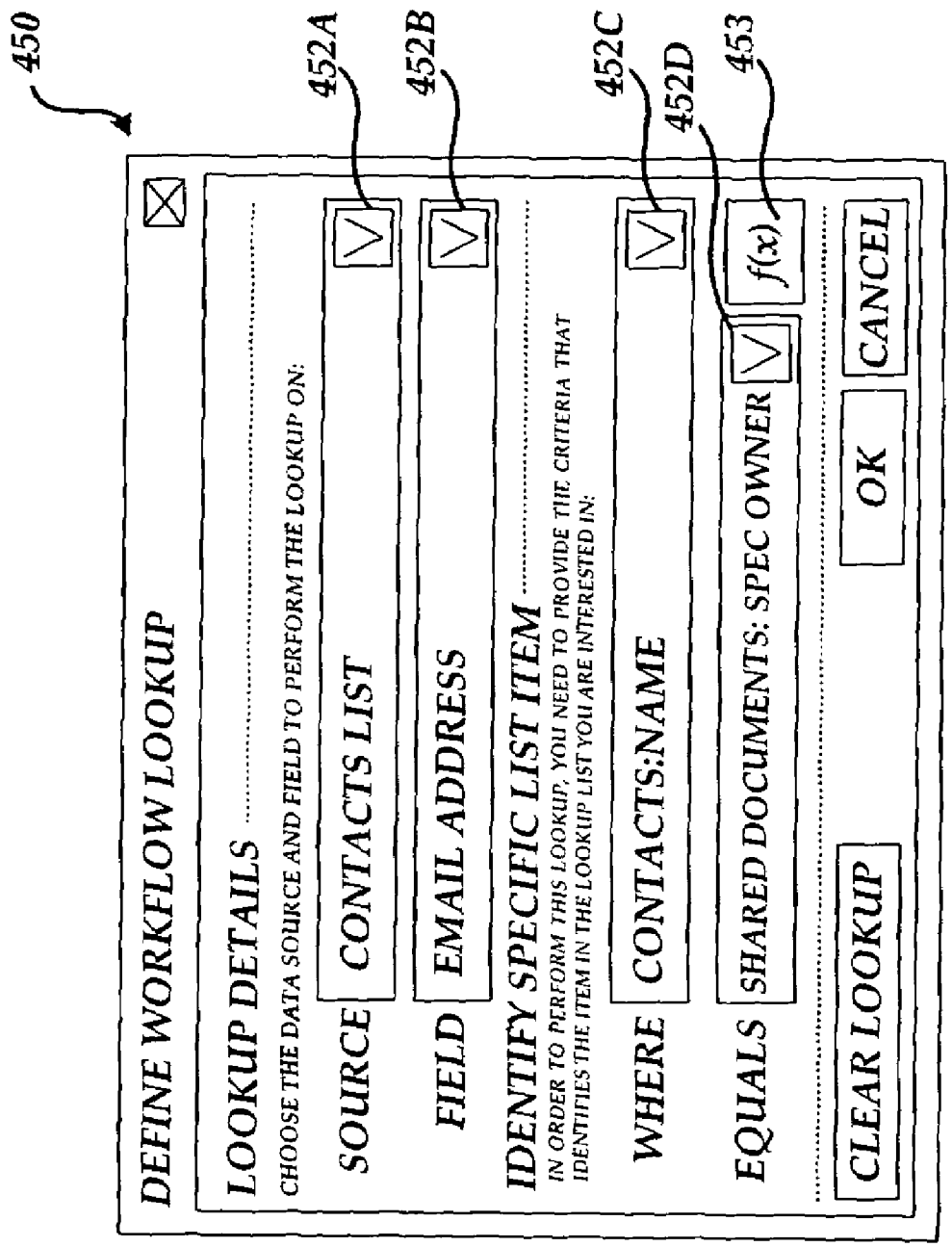

Referring now to FIGS. 4A and 4B, an illustrative user interface provided by the workflow authoring tool 110 for declaratively binding data sources to parameters in workflow actions 116 will be described. In particular, FIGS. 4A-4B show several illustrative user interfaces 400 and 450 that can be utilized by a workflow designer to graphically bind data sources to the various parameters utilized by a workflow action 116.

As discussed above, workflow schedules 112 can include decision logic that allows actions to be performed when certain conditions are met. For instance, a rule may be created within a workflow schedule 112 that assigns an expense report to a manager for approval when the total amount of the expense report is less than a certain amount. The user interfaces 400 and 450 shown in FIGS. 4A-4B allow the workflow designer to specify the properties of such a rule in a graphical manner. Through these user interfaces, the user has the option of specifying a static value for each property or choosing to make the parameter data-driven so that at runtime the value loaded into the parameter is looked up dynamically. Parameters may be assigned to data fields within any list maintained by the collaborative application 124.

The user interface 400 shown in FIG. 4A is displayed when a user is graphically creating the conditions and actions for two rules 404A and 404B that define one step of a workflow. In the example shown in FIG. 4A, the user is defining a process for the approval of a business expense. When a parameter of the condition or action may be specified by a user, an icon is displayed adjacent to the parameter thereby indicating that the parameter can be specified or bound to a data value. In response to the selection of the icon, the user interface 450, described below with respect to FIG. 4B is presented.

Once the user has bound a parameter to a data value in the manner described below with reference to FIG. 4B, the parameters are illustrated in the user interface 400 with underlining to indicate that they are a hyperlink that can be selected and modified. For instance, in the example shown in FIG. 4A, the parameters 402A-402E have been underlined, thereby indicating that they are selectable parameters that have been bound to a data source or manually specified. The parameters 402A-402E can be selected to modify the specified value or source of the data bound value.

FIG. 4B shows an illustrative user interface 450 for binding the parameters to a list, the value from a previous action, or to an input parameter. In one implementation, the user interface 450 includes drop-down menus 452A and 452B through which a user may choose the data source and field of the data source to perform the lookup on for the associated data parameter. In particular, the drop-down menu 452A is utilized to specify the data source and the drop-down menu 452B is utilized to specify the field of the selected data source. When selected, the drop-down menu 452A provides a list of available data sources and the drop-down menu 452B provides a list of fields within the data source selected in the drop-down menu 452A. It should be appreciated that the data source may comprise an item in the current list or come from an external source, such as another list maintained by the collaborative application 124.

If a user has requests that a parameter be bound to an external list, the query must be narrowed down so that a single item may be returned. In order to accomplish this, the user interface 450 includes two additional drop-down menus 452C and 452D. When selected, the drop-down menu 452C lists the set of fields in the external list chosen in the manner described above. The drop down menu 452D identifies the set of workflow parameters and the set of fields in the associated list when selected. The drop-down menu 452D is also editable so that the user can type in a value.

According to one implementation, the user interface 450 also includes a button 453 that allows a user to data bind multiple levels of the user interface 450. In particular, selection of the button 453 allows a user to input an expression that defines the item in the lookup list that should be bound to. The user interface 450 may also include a button for clearing the contents of the fields of the user interface 450. It should be appreciated that although drop-down menus and buttons have been utilized in the illustrative user interface 450 shown in FIG. 4B, other types of suitable user interface controls may be utilized that allow a user to select from a list of data sources and fields.

Figure 5:
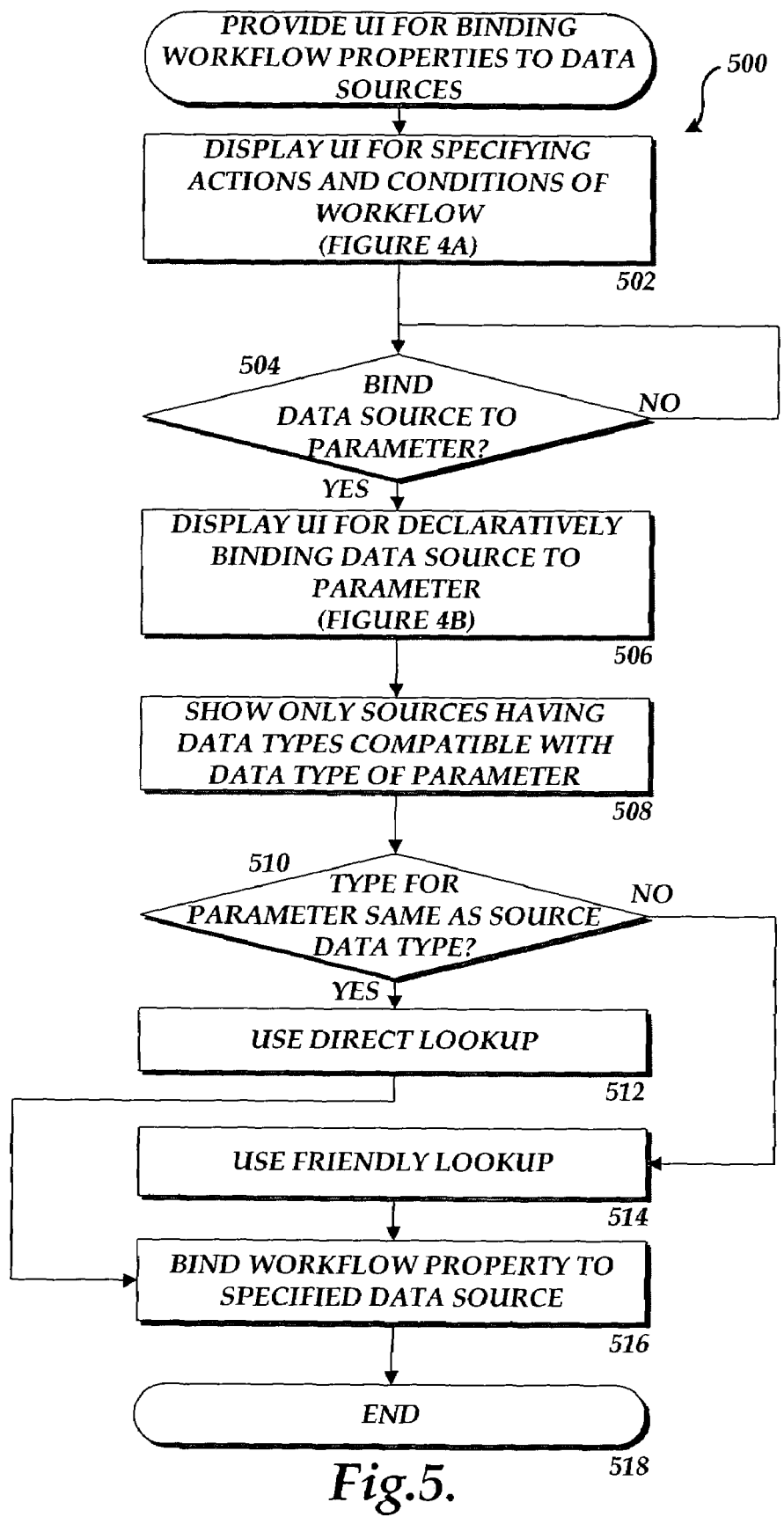
FIG. 5 is a flow diagram showing an illustrative process for declaratively binding workflow properties to data sources.

Turning now to FIG. 5, an illustrative routine 500 will be described for declaratively binding a workflow action parameter to a data source and for propagating the data type for data returned from a data source to the data type of the parameter. In particular, the routine 500 begins at operation 502, where the authoring tool 110 displays the user interface 400 shown in FIG. 4A for specifying the actions and conditions of the workflow. The routine 500 then continues to operation 504, where a determination is made as to whether a user has requested that a parameter be bound to a data source. This may occur, for instance, in response to a user selecting one of the parameters 402A-402E displayed in the user interface 400. If a user does request that a workflow action parameter be bound to a data source, the routine 500 continues from operation 504 to operation 506.

At operation 506, the workflow authoring tool 110 displays the user interface 450 for declaratively binding a data source to a workflow parameter shown in FIG. 4B. The user is then permitted to select the drop-down menus 452A and 452B to select the data source to which the selected workflow parameter will be bound. According to one implementation, the drop-down menus 452A and 452B will only include sources and fields having data types that are compatible with the data type of the selected workflow parameter. This occurs at operation 508 of the routine 500.

At decision operation 510, a determination is made as to whether the data type for the selected workflow parameter (the "target") is the same as the same as the data type for the selected data source (the "source). If the data types are the same, then an internal lookup of the data may be performed to provide the highest fidelity data lookup. This occurs at operation 512. If, however, the data types are not the same, the data contained in the source must be converted to the data type of the target. In order to perform this procedure, the routine 500 branches from operation 510 to operation 514, where a "friendly" data lookup is utilized.

A "friendly" data lookup allows data of one data type to be converted to data of another data type. For instance, if the source is a number type while the target is a string type, the number type may be converted to a string upon lookup. Other data transformations may also be provided by the friendly lookup procedure. In this manner, the data type of the target is propagated to data retrieved from the source.

Once the user has selected the desired data source using the user interface 450, the routine 500 continues from operations 512 and 514 to operation 516 where the workflow property is bound to the selected data source. Using either the direct lookup or the friendly lookup described above, data from the data source is retrieved and utilized in the workflow parameter at runtime. From operation 516, the routine 500 continues to operation 518, where it ends.

Figure 6:
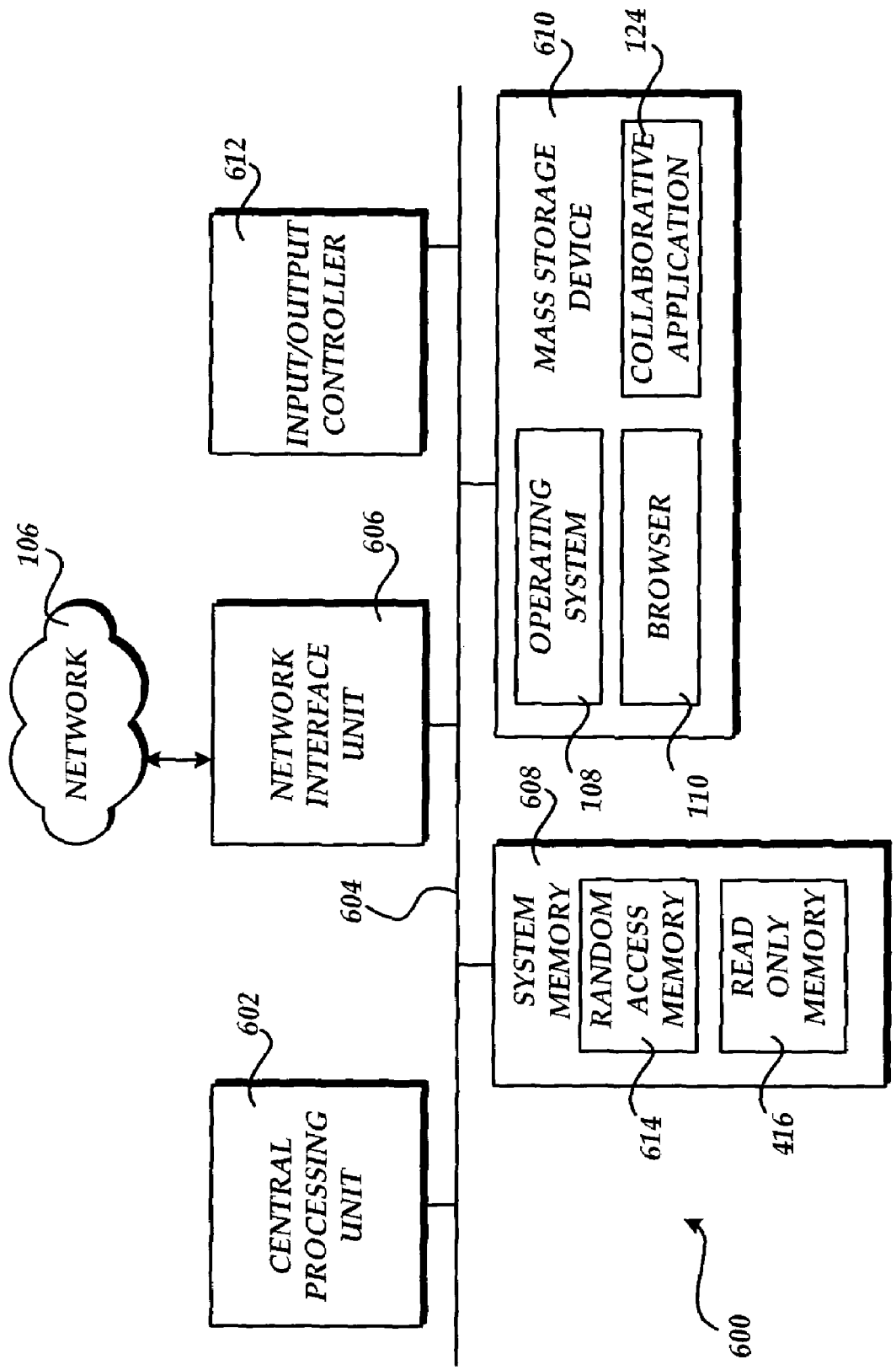
FIG. 6 is a computer architecture diagram showing one computer architecture suitable for implementing the various computer systems described herein.

Referring now to FIG. 6, an illustrative computer architecture for a computer 600 utilized in the various embodiments presented herein will be discussed. The computer architecture shown in FIG. 6 illustrates a conventional desktop, laptop computer, or server computer. The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 further includes a mass storage device 610 for storing an operating system 108, application programs, and other program modules, which are described in detail above with reference to FIG. 1.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network 106, such as the Internet. The computer 600 may connect to the network 106 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 108 suitable for controlling the operation of a networked desktop or server computer, such as the WINDOWS XP operating system from MICROSOFT CORPORATION of Redmond, Wash., or the WINDOWS VISTA operating system, also from MICROSOFT CORPORATION. The mass storage device 610 and RAM 614 may also store one or more program modules. In particular, the mass storage device 610 and the RAM 614 may store a Web browser program 110, a collaborative application 124, and the other program modules described above with respect to FIG. 1. Other program modules may also be stored in the mass storage device 610 and utilized by the computer 600.

Based on the foregoing, it should be appreciated that systems, methods, and computer-readable media for remotely authoring a workflow schedule are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for declaratively binding a parameter in a workflow action rule to a data value, the method comprising:

displaying a user interface for binding the parameter to the data value, the user interface comprising a first user interface control identifying one or more data sources having a data type that is compatible with a data type of the parameter and to which the parameter in the workflow action rule may be bound and a second user interface control identifying one or more fields of the data source having a data type that is compatible with the data type of the parameter and to which the parameter in the workflow action rule may be bound;

receiving a selection of one of the data sources in the first user interface control and a selection of one of the fields in the second user interface control;

in response to receiving the selections, binding the parameter in the workflow action rule to the selected field of the selected data source; and in response to determining that the selected field of the selected data source has a data type that is not identical to the data type for the parameter, converting the data type of the selected field to the data type of the parameter at the runtime of the workflow action rule.

2. The method of claim 1, wherein the data source comprises an item in a list associated with a current workflow.

3. The method of claim 1, wherein the data source comprises a local data member of a current workflow.

4. The method of claim 1, wherein the data source comprises an item in an external list not associated with the current workflow, and wherein the user interface further comprises a user interface control identifying one or more data fields in the external list to which the parameter may be bound.

5. The method of claim 4, wherein the user interface further comprises a user interface control for specifying a value of a selected field in the external list.

6. The method of claim 5, wherein the user interface control for specifying a value of a selected field in the external list is operative to display one or more workflow parameters.

7. The method of claim 6, wherein the user interface control for specifying a value of a selected field in the external list is further operative to display one or more fields in a list associated with a current workflow.

8. The method of claim 7, wherein the user interface further comprises a user interface control which, when selected, provides a user interface control for specifying an expression that defines an item in the external list to which the parameter should be bound.

9. The method of claim 6, wherein the user interface further comprises a user interface control which, when selected, will clear a value in the user interface control identifying one or more data sources to which the parameter may be bound, a value in the user interface control identifying one or more fields in the selected data source to which the parameter may be bound, a value in the user interface control identifying one or more data fields in the external list to which the parameter may be bound, and a value in the user interface control for specifying a value of a selected field in the external list.

10. A computer-implemented method for binding a parameter in a workflow action rule to a data value, the method comprising:

providing a user interface through which a data source to which the parameter in the workflow action rule should be bound may be selected;

receiving a selection through the user interface of a selected data source to which the parameter in the workflow action rule should be bound;

determining whether the selected data source has a data type that is identical to a data type for the parameter in the workflow action rule;

in response to determining that the selected data source has a data type that is identical to a data type for the parameter in the workflow action rule, performing an internal lookup operation at a runtime of the workflow action rule to retrieve the data value from the data source for the parameter in the workflow action rule;

determining whether the selected data source has a data type that is compatible with the data type for the parameter;

in response to determining that the selected data source has a data type that is compatible with the data type for the parameter, converting the data type of the selected data source to the data type of the parameter; and in response to determining that the selected data source has a data type that is not identical to the data type for the parameter, converting the data type of the selected data source to the data type of the parameter at the runtime of the workflow action rule.

11. The method of claim 10, wherein the user interface further comprises a control for selecting a data source to which the parameter should be bound, and wherein the control for selecting a data source is filtered to thereby display only data sources having a data type that is compatible with the data type of the parameter.

12. The method of claim 11, wherein the user interface further comprises a control for selecting a data field of the selected data source to which the parameter should be bound, and wherein the control for selecting the data field is filtered to thereby display only data fields of the selected data source having a data type that is compatible with the data type of the parameter.

13. A computer-readable medium having computer-executable instructions stored thereon which, when executed by a computer, cause the computer to:

generate and display a user interface for binding a workflow parameter to a data value in a workflow action rule, the user interface comprising a user interface control for selecting a data source to which the workflow parameter should be bound and a user interface control for selecting a data field of the data source to which the workflow parameter should be bound, wherein the user interface control for selecting a data source to which the workflow parameter should be bound is filtered to thereby display only data sources having a data type that is compatible with the data type of the workflow parameter and wherein the user interface control for selecting a data field of the data source to which the workflow parameter should be found is filtered to display only data sources having a data type that is compatible with the data type of the workflow parameter;

bind the workflow parameter to the data source and data field based upon user input received via the user interface;

determine whether a selected data field of a selected data source has a data type that is identical to a data type for the workflow parameter;

perform an internal lookup operation at a runtime of the workflow action rule to retrieve the data value from the data source for the parameter in response to determining that the data field of the selected data source has a data type that is identical to the data type for the parameter; and to convert the data type of the data value to the data type of the parameter at the runtime of the workflow action rule in response to determining that the data field of the selected data source has a data type that is not identical to the data type for the parameter.

* * * * *